(12) United States Patent
Koeune

(10) Patent No.: US 6,845,798 B1
(45) Date of Patent: Jan. 25, 2005

(54) LOCKED BEAD CONSTRUCTION

(75) Inventor: Jean-Marie Jules Joseph Koeune, Bastogne (BE)

(73) Assignee: The Goodyear Tire & Rubber Co., Akron, OH (US)

( * ) Notice: Subject to any disclaimer, the term of this patent is extended or adjusted under 35 U.S.C. 154(b) by 0 days.

(21) Appl. No.: 10/089,259

(22) PCT Filed: Sep. 30, 1999

(86) PCT No.: PCT/US99/22568
§ 371 (c)(1),
(2), (4) Date: Jun. 17, 2002

(87) PCT Pub. No.: WO01/25031
PCT Pub. Date: Apr. 12, 2001

(51) Int. Cl.⁷ .................... B60C 15/00; B60C 15/06; B29D 30/18
(52) U.S. Cl. .............. 152/539; 152/541; 152/552; 152/554; 156/131; 156/132
(58) Field of Search .............. 152/539, 541, 152/547, 552, 554, 555

(56) References Cited

U.S. PATENT DOCUMENTS

| | | | |
|---|---|---|---|
| 1,147,032 A | | 7/1915 | McNaull |
| 1,188,062 A | | 6/1916 | Gammeter |
| 2,994,358 A | | 8/1961 | Trevaskis |
| 3,301,303 A | | 1/1967 | Travers |
| 3,654,007 A | * | 4/1972 | Winstanley et al. ........ 156/132 |
| 3,736,974 A | * | 6/1973 | LeJeune ................. 152/540 |
| 3,784,426 A | | 1/1974 | Woodhall et al. |
| 4,139,040 A | | 2/1979 | Samoto et al. |
| 4,185,676 A | | 1/1980 | Raluy |
| 4,580,610 A | * | 4/1986 | Jackson ................. 152/516 |
| 4,700,765 A | | 10/1987 | Masclaux |
| 4,854,361 A | | 8/1989 | Gasowski et al. |
| 4,922,985 A | | 5/1990 | Gasowski et al. |
| 5,058,649 A | | 10/1991 | Hoang et al. |
| 5,125,446 A | | 6/1992 | Durif |
| 5,232,033 A | | 8/1993 | Durif |
| 5,323,830 A | | 6/1994 | Diernaz |
| 5,513,683 A | * | 5/1996 | Causa et al. ............ 152/209.4 |
| 5,513,686 A | | 5/1996 | Diernaz |
| 5,620,539 A | | 4/1997 | Ide |
| 5,743,976 A | | 4/1998 | Pena et al. |
| 5,779,829 A | | 7/1998 | Prakash et al. |
| 6,463,975 B1 | * | 10/2002 | Auxerre ................. 152/454 |

FOREIGN PATENT DOCUMENTS

| | | |
|---|---|---|
| EP | 0953435 | 3/1999 |
| FR | 1327810 | 4/1963 |
| FR | 2678544 | 1/1993 |
| FR | 2773518 | 7/1999 |
| GB | 1000113 | 8/1965 |
| JP | 2-293207 | * 12/1990 |
| JP | 3-204314 | * 9/1991 |

* cited by examiner

*Primary Examiner*—Blaine Copenheaver
*Assistant Examiner*—Justin Fischer
(74) *Attorney, Agent, or Firm*—Howard M. Cohn

(57) ABSTRACT

The present invention relates to a locked bead type of tire construction where the turnup ends (242a, 242b) of the carcass plies (242) are tuned up around an elastomeric torus (246a, 246b) located outwardly from and adjacent to the bead cores (244a, 244b) so that the locked end sections (250a, 250b) of the plies are folded back and placed radially inward of the bead cores so they are anchored chored between the bead cores and the turnup ends of the carcass plies.

17 Claims, 3 Drawing Sheets

LOCKED BEAD CONSTRUCTION

TECHNICAL FIELD

The present invention relates to a pneumatic tire, specifically to the carcass ply turnup structure in the bead region and more specifically to a locked bead type of construction.

BACKGROUND OF THE INVENTION

In conventional tire construction, the carcass ply or plies are turned up around the bead cores and then extended radially outward in the sidewalls towards the tread in order to withstand the tensile stresses encountered during the use of the tire. As these stresses act in opposite direction on the carcass ply or plies proper and their upward turned portions, they cause shearing in the intermediate rubber.

Furthermore, the flexing of the sidewalls during travel subjects the carcass reinforcement and the upward-turned portions thereof to alternate stresses, in opposite directions, which causing additional shear stresses in this same zone. All of these stresses may lead to the rupture of the intermediate rubber and premature destruction of the tire.

To avoid these drawbacks, tire designers have extended the upward turned portions of the carcass plies into zones of lesser shear, that is to say a greater distance radially outward in the sidewalls; however, in such cases the rigidity of the sidewalls is increased; ruptures of the upward turned portions of the plies may take place by compression in the sidewalls and in any event the road behavior of the tire is greatly modified.

The desirability of minimizing or eliminating the extension of the turnup portions of the carcass ply (or plies) radially outwardly of the bead core is the premise on which prior art locked-beads designs were developed. The proposed advantages included improved bead durability, and reduced material costs. Furthermore, the locked-bead approach allows the sidewalls to have a reduced thickness in the vicinity of the bead region. This reduced sidewall thickness results in a better distribution of flexibility that is particularly advantageous with tires having a small height to width ratio (for example of the order of 0.6).

However, locked-bead tire designs require a careful consideration of how best to anchor the carcass plies in the bead region without an excessive concentration of stress at the carcass ply ends.

One approach is to clamp the carcass plies to the bead core. For example, U.S. Pat. No. 4,922,985. ('985) discloses a carcass ply having a main portion that extends between both head cores of the tire and turnup portions that are anchored around each bead core by a clamping member. According to '985, the clamping member comprises a strip of side-by-side cords of a heat shrinkable material embedded in a suitable elastomeric substance having a permanent thermal shrinkage of at least 2 percent.

Another approach, as disclosed by U.S. Pat. No. 4,185,676, ('676) is to extend the portions of the carcass reinforcement that have been turned upward around the bead rings toward the outside of the tire and embed them in an annular portion of the tire that protrudes from the outer lower portion of the corresponding sidewall. According to '676, a mechanical de-coupling is obtained between the elastic matrices surrounding the carcass reinforcement and its upward turned portions, thus eliminating shearing in these zones.

Another approach, as disclosed by WO95/23073 is, in each bead region of the tire, to wrap a turnup end of the carcass reinforcing ply around a wedge-shaped rubber section which is disposed adjacent and axially (or laterally) inward (towards the equatorial plane) of the bead.

It is continually the goal in the art to simplify the construction and reduce the expense of building locked-bead type tires, yet improve the durability, handling, rolling resistance and other properties of the tires.

OBJECTS OF THE INVENTION

It is an aspect of the present invention to provide a more efficient tire bead manufacturing process as defined in one or more of the appended claims and as such, having the capability of accomplishing one or more of the following subsidiary objects.

An aspect of the present invention is to improve bead durability by eliminating stresses at ply ending.

Another aspect of the present invention is to minimize the shear stresses at the chafer/ply interface in the bead area by eliminating the ply turn-up around the bead.

Yet another aspect of the present invention is to maximize sidewall flexibility in the vicinity of the rim flange to increase the tire load capacity and improve rim-bead seating.

Other aspects and advantages of this invention will become readily apparent as the invention is better understood by reference to the accompanying drawings and the detailed description that follows.

SUMMARY OF THE INVENTION

The present invention relates to a pneumatic tire, specifically to the carcass ply turnup structure in the bead region and more specifically to a locked bead type of construction.

The preferred embodiment of the present invention is a pneumatic tire having a tread, a belt structure, and a carcass structure comprising a pair of sidewalls, a pair of bead regions, and one or more plies of cord reinforced elastomeric material anchored in each bead region and extending radially outward through the sidewalls and laterally across a crown portion of the tire radially inward of tread.

The bead regions of the present invention each comprise an inextensible annular bead core in a side-by-side relationship with a coaxial elastomeric torus, the torus placed outwardly adjacent to each bead core relative to the equatorial plane of the tire. The carcass plies within each bead region extend radially inward from the sidewalls and proceed inward of the bead core relative to the equatorial plane of the tire. The carcass plies are then wrapping around and radially outward of the elastomeric torus with the locked edge of the carcass plies located back under and radially inward of the bead core.

The elastomeric torus can be made of pre-cured rubber or reinforced by fibers, including by way of example and not by way of limitation, materials such as glass Aramid, steel, or polyester.

A method of forming a tire according to the present invention using a tire building drum of substantially conventional design upon which the carcass plies, the bead core and the elastomeric torus are assembled. The method includes the steps of; placing the pair of elastomeric toruses over the carcass material for their incorporation in the bead regions of the tire; folding the margins of the carcass material over the top of the elastomeric toruses; placing a bead core inwardly adjacent to the enfolded elastomeric torus relative to the center of the drum; and expanding the drum to hold the bead cores in place, inflating the carcass and completing the tire by conventional tire building processes.

The tire forming drum can be provided with a groove to hold the torus, Also the center of the drum may be expanded after the application of the bead core and before the addition of the chafer and other components to prevent bead deformation.

BRIEF DESCRIPTION OF THE DRAWINGS

Reference will be made in detail to preferred embodiments of the invention, examples of which are illustrated in the accompanying drawings. The drawings are intended to be illustrative, not limiting.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199b, 199c, etc.

The cross-sectional views presented herein may be in the form of "slices", or "near-sighted" cross-sectional views, omitting certain background lines which would otherwise be visible in a true cross-sectional view, for illustrative clarity.

Figure 1:
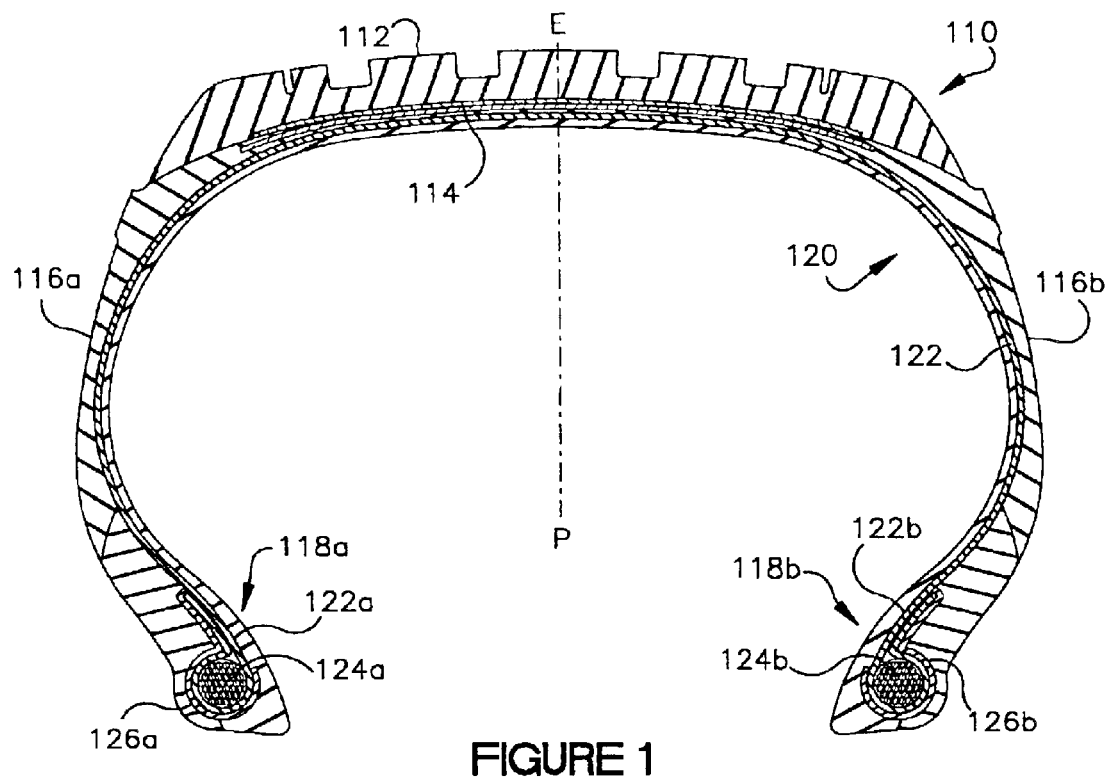
Figure 2:
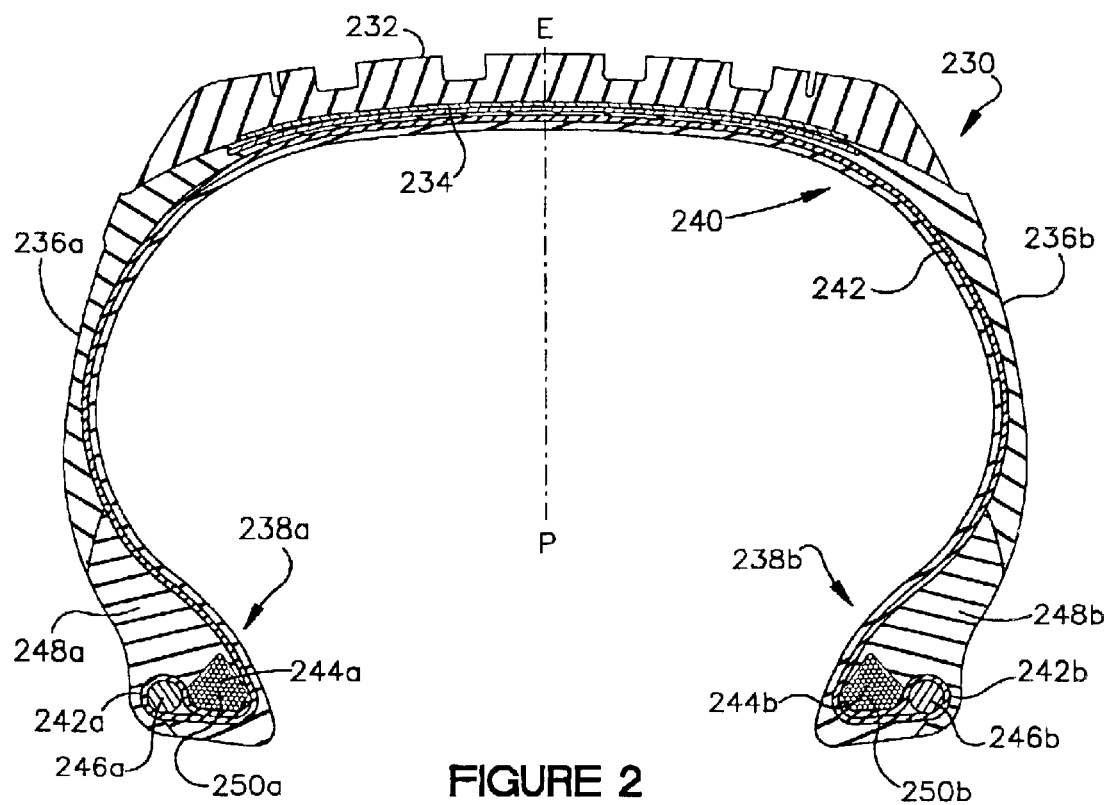
Figure 3:
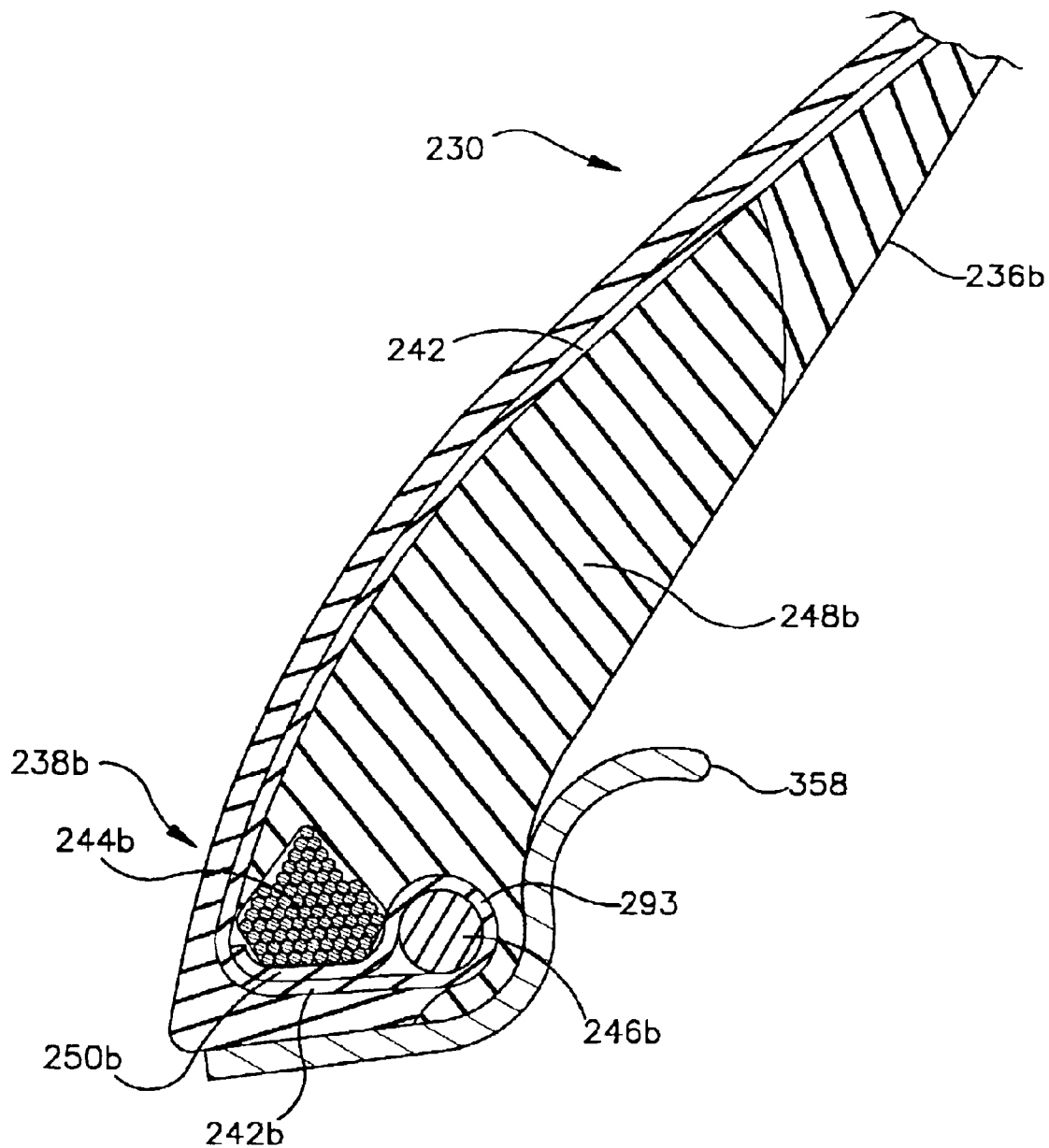

The structure, operation, and advantages of the present preferred embodiment of the invention will become further apparent upon consideration of the following description taken in conjunction with the accompanying drawings, wherein:

FIG. 1 is the cross-sectional view of a prior art tire with a conventional locked-bead construction;

FIG. 2 is a cross-sectional view of an embodiment of the present invention incorporating and new generation of locked-bead construction;

FIG. 3 is a partial view of the bead region of a tire of the present invention.

Figure 4A:
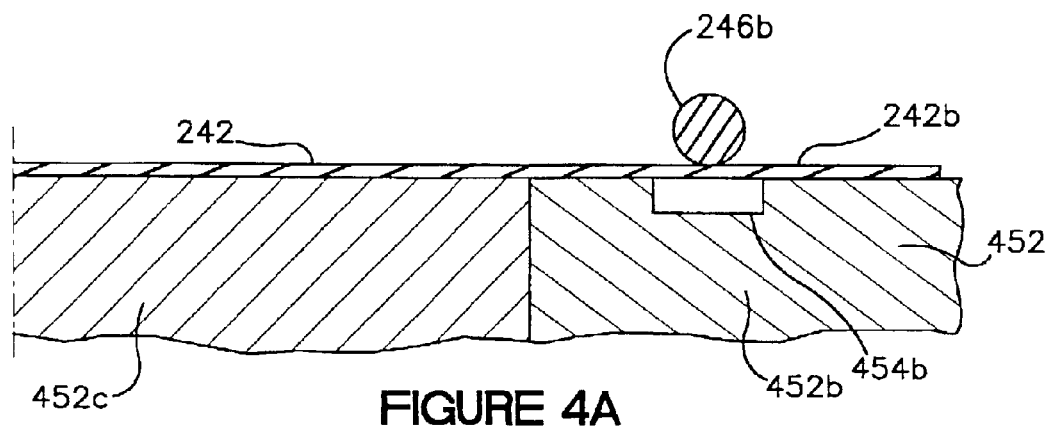
Figure 4B:
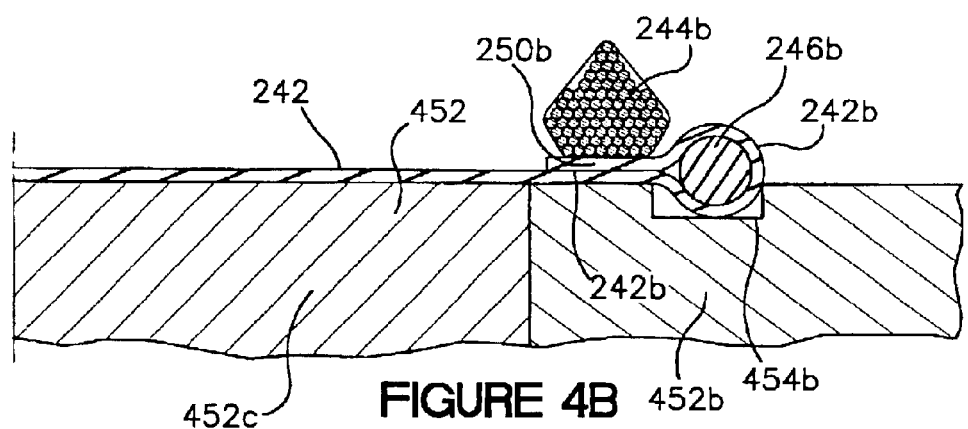
Figure 4C:
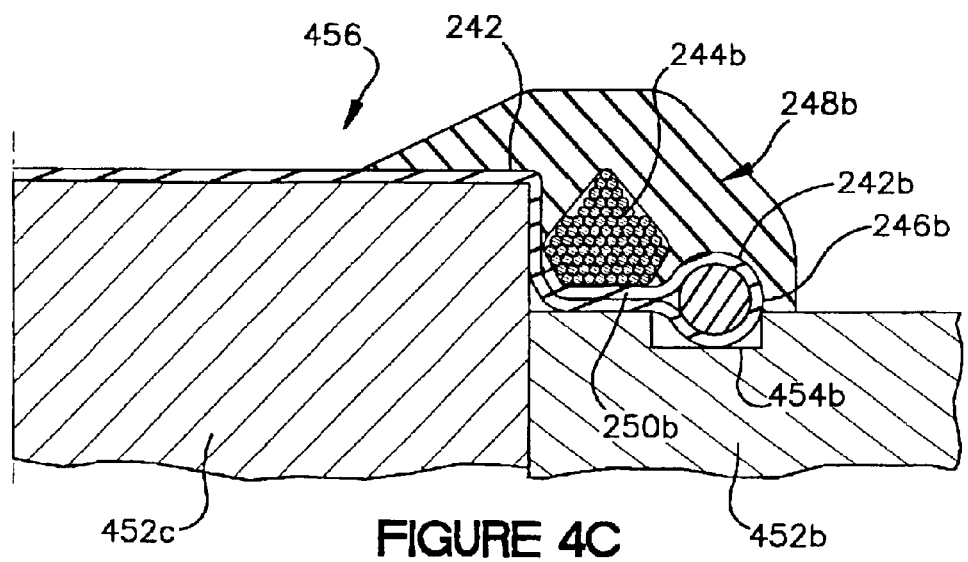

FIG. 4A is a partial view of the present invention on a tire forming drum during an initial step of the manufacturing process;

FIG. 4B is a partial view of the present invention on tire forming drum during an intermediate step of the manufacturing process; and FIG. 4C is a partial view of the present invention on a tire building drum during a final step of the manufacturing process.

DEFINITIONS

"Apex" means an elastomeric filler located radially above the bead core and between the plies and the turnup plies. "Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface.

"Inner Liner" means the layer or layers of elastomeric or other material that form the inside surface of a tubeless tire and that contain the inflating fluid within the tire.

"Insert" means the crescent-shaped or wedge-shaped reinforcement typically used to reinforce the sidewalls of runflat-type tires.

"Lateral" means a direction parallel to the axial direction.

"Ply" means a cord-reinforced layer of rubber coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65 degrees and 90 degrees with respect to the equatorial plane of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Tread Cap" refers to the tread and the underlying material into which the tread pattern is molded.

"Tread width" means the arc length of the tread surface in the plane includes the axis of rotation of the tire.

DETAILED DESCRIPTION OF THE PREFERRED EMBODIMENT

Prior Art Embodiment

Referring to FIG. 1 there is shown a prior art locked bead tire 110. The prior art tire 110 has an annular tread 112 disposed radially outward of annular belt structure 114. Radially inward of the belt structure 114, is a carcass structure 120 comprising one or more carcass plies 122 extending laterally between bead cores 124a,124b. The turnup ends 122a,122b of the carcass ply are turned up around the bead cores 124a,124b and anchored to the beads by clamping members 126a,126b. The clamping members 126a,126b comprise strips of side-by-side cords of a heat shrinkable material embedded in a suitable elastomeric substance and having a permanent thermal shrinkage of at least 2 percent. This strip of cords extends circumferentially and extends in contact with the carcass ply 122 (or the innermost carcass if the tire is provided with multiple carcass plies) from a location radially and axially inward of the bead core 124a,124b to a location radially outward of the bead core and adjacent to the main portion of the carcass ply 122.

As is characteristic of prior art locked bead designs the carcass ply 122 is turned up around the bead cores 124a, 124b without any significant gaps between the carcass ply and the bead cores. In tires according to this prior art embodiment, turned up ends 122a,122b of the carcass ply 122 extend radially outward from the bead core 124a,124b a minimum distance to allow some pull-down of the carcass ply during the shaping and curing process. Otherwise the carcass ply 122 might not be anchored to the bead cores 124a,124b by the clamping members 126a,126b.

To the extent that the turned up ends 122a,122b of the carcass ply 122 are placed adjacent to the main portion of the carcass ply 120 and there is no filler or apex disposed between the main portion and the turned up portion of the carcass ply. The placement of the turned up ends 122a,122b of the carcass ply 122 adjacent to the bead cores 124a,124b and the main portion of the carcass ply 122 without fillers or apex is the distinguishing characteristic of a locked bead type of tire construction.

Locked bead construction as exemplified by the prior art tire 110 illustrated by FIG. 1 provides the sidewalls 116a, 116b of the tire with increased flexibility in the proximity of the bead cores 124a,124b and reduces destructive shear stresses between the turned up ends 122a,122b of the carcass ply 122 and the central portion of the carcass ply 122 that are caused by bending. Because there are no fillers or apexes, the thickness of the sidewall 116a,116b in the proximity of the bead cores 124a,124b is minimized. With reduced thickness, the sidewalls 116a,116b provide a reduced resistance to bending. Since the turned up ends 122a,122b and the main portion of the carcass ply 122 are adjacent, bending induced shear stresses between these portions of the carcass structure 120 are minimized. In addition, minimizing the radially inward extent of the turned up ends 122a,122b of carcass ply 122 also effectively limits the extent of bending induced shear stresses between portions of the carcass ply 122.

Preferred Embodiment of the Present Invention

FIG. 2 illustrates an improved locked bead tire 230 according to the present invention. The tire 230 is provided with an annular tread 232 and a belt structure 234 located radially inward of the tread. The tire 230 has a carcass structure 240 comprising two sidewalls, 236a,236b and two bead regions 238a,238b with at least one carcass ply 242 having turnup ends 242a,242b anchored in bead region 238a,238b, as discussed in more detail below. The turnup ends extend radially outward through sidewall 236a,236b, proceeding laterally and radially inward of the belt structure 234, returning radially inward through sidewalls 236a,236b and anchored in bead region 238a,238b.

The bead regions 238a,238b comprise an inextensible bead core 244a and 244b, respectively, and an elastomeric torus or ring 246a and 246b, respectively. Each elastomeric torus 246a,246b is located laterally outward from and adjacent to the bead cores 244a,244b, respectively, relative to the equatorial plane EP of the tire 230. The elastomeric torus 246a,246b is preferably constructed of a pre-cured or partially cured rubber so that the torus can be easily handled and will maintain its shape during the initial manufacturing stages. The toruses 246a,246b can be reinforced by fibers of materials including glass, aramid, steel and polyester. Preferred section diameter of torus 246a, 246b is 5 mm to 8 mm which is compatible with the carcass ply flexibility. While the toruses are shown with a circular cross section, it is within the scope of the invention to provide a torus with other geometrical cross sections, such as but not limited to square, oblong, triangular and octagonal.

Referring to FIG. 3, a detail the head region 238b of the tire 230 mounted on a tire rim 358 is illustrated. Bead region 238a is a mirror image of bead region 236b and therefore not discussed. As shown in FIG. 3. ply 242 extends down sidewall 236b and includes a turnup end 242b that initially wraps around and under bead core 244b. Turnup end 242b then extends laterally outward under the bead core 244b relative to the equatorial plane of tie tire 230, under the elastomeric torus 246b and is then turned up and around the elastomeric torus 246b. Continuing, the turnup end 242b is folded back under the bead core 244b so that the locked end section 250b of the carcass ply turnup end 242b is located radially inward of the bead core 244b and anchored between the bead core and the initial turn of the carcass ply end 242b where it extends laterally outward from the central portion of ply 242 and around and under the bead core 244b. Note that the locked end sections 250a,250b can wrap around the bead cores 244a,244b and extend upward adjacent against the central portion of the ply 242.

Dynamic Operation of the Preferred Embodiment Relative to the Prior Art

The preferred embodiment of the present invention provides all the benefits of conventional locked bead construction, as shown in FIG. 1, including improved sidewall flexibility and the minimization of bending induced shear stresses where turned up portions of the carcass ply are placed adjacent to main portions of the carcass ply. In typical tire construction, as shown in FIG. 1, due to the compression effect when the tire is deflected, harmful shear stress often occur where the turned up ends 122a,122b of the carcass structure 120 extends radially outward of the bead cores 124a,124b, respectively, as the load on the tire 110 tends to pull the main portion of the carcass ply 122 radially outward while the turned up end portions 122a,122b of the carcass 122 is pulled radially inward. These stresses are concentrated in the turned up ends 122a,122b of the carcass structure 120 which are constrained by the surrounding elastomeric material and with the assistance of clamping members 126a,126b as described herein for prior art locked bead tires.

The present invention addresses this issue by providing locked end sections 250a,250b of the turnup ends 242a,242b of the carcass ply 242 radially inward of the bead cores 244a,244b, respectively, so that they are constrained between the bead cores 244a,244b and the turnup ends 242a,242b and the main portion of the carcass ply 242. This implies that the carcass ply 242 remains on tension when the tire is inflated or inflated and loaded. In addition, the elastomeric torus 246a,246b performs a stress relief function that prevents concentrations of stress in the carcass ply 242. Stresses in the cords of the carcass ply will cause the elastomeric torus 246a,246b to deform reducing the stress on the carcass ply cords and facilitating the distribution of stress between adjacent ply cords. In comparison, locked bead designs where the carcass ply is anchored directly to an inextensible bead core will see higher concentrations of stress at the interface between the ply cords and the bead core.

Method of Manufacture

In accordance with the present invention the carcass ply 242 is securely anchored in the bead regions 238a,238b of the tire 230 without requiring the extension of a turned up ends 242a,242b of the carcass ply to extend radially outward beyond the bead cores 238a,238b. This is accomplished by first turning the ends 242a,242b of the carcass ply 242 up around the elastomeric torus 246a,246b, respectively with anchored end sections 250a,250b disposed against the ends 242a,242b of the ply 242. The bead cores 244a,244b are then placed on the outer facing surface of anchored end sections 250a,250band inwardly adjacent to the now enfolded elastomeric torus 246a,246b relative to the equatorial plane of the tire 230 thereby securing the anchored end sections 250a,250b of the ply 242 radially inward of the bead cores 244a,244b.

Referring to FIGS. 4A,4B and 4C, several steps in the process of Forming the bead regions 238a,238b using a substantially conventional tire building drum are illustrated. Only the formation of bead region 235b is described, since both regions are formed in the same manner. FIG. 4A illustrates the initial step in process of building the tire 230 according to the present invention wherein the carcass ply 242 is placed on the tire building drum 452 followed by the addition of the elastomeric torus 246b above a groove 454b formed in a section 452b. At rest, the inside diameter of the elastomeric torus 246b should preferably be slightly smaller than the diameter of the drum 452 at the bottom of the groove 454b during the initial building step. The elastomeric torus 246b may be held in place within groove 454b in section 452b of the drum by pressing the elastomeric torus into groove 454b by any conventional means. As illustrated by FIG. 4B, the turnup end 242b of the carcass ply 242 is then folded back over the elastomeric torus 246b toward the center section 452e of the drum 452 and the bead core 244b is placed upon the locked or anchored end section 250b inwardly of and adjacent to the now enfolded torus 246b relative to the center portion 452c of building drum 452. Referring to FIG. 4C, the center portion 452c of the drum 452 is expanded prior to the addition of the chafer 248b to prevent movement of the bead core 244b when the carcass 242 is inflated and the manufacture of the tire 230 is completed by conventional tire building processes well known to those familiar with the art.

While the invention has been described in combination with embodiments thereof, it is evidents that many alternatives, modification varification will be apparent to those skilled in the art in light of the foregoing teachings. Accordingly, the invention is intended to embrace all such alternatives, modifications and varification as fall within the spirit and scope of the appended claims.

What is claimed:

1. A pneumatic tire having a tread, a belt structure, a pair of sidewalls, a pair of bead regions, one or more plies anchored in each bead region, the pair of bead regions each including an inextensible annular bead core and an elastomeric element disposed adjacent to each bead core, wherein:

the elastomeric element is disposed axially outwardly from the bead core relative to the equatorial plane of the tire;

the carcass ply having a pair of turnup ends within the bead regions that extend radially inward from the carcass ply and under the bead cores relative to the equatorial plane of the tire, the turnup ends continue under and are turned up wrapping around the elastomeric elements, wrapping around the elastomeric element with the locked end sections of the carcass ply located radially inward of the bead cores and anchored between the bead cores and the carcass plies;

the bead core is in a side-by-side relationship with the elastomeric element; and the tire has a locked bead type of construction, a distinguishing characteristic of which is that there is no filler or apex disposed between a main portion and a turned up portion of the carcass ply.

2. The tire of claim 1 characterized in that the elastomeric elements are made of pre-cured rubber.

3. The tire of claim 2 characterized in that the elastomeric elements are reinforced by fibers of materials including glass, Aramid, steel or polyester.

4. A method of forming a tire on a tire building drum, characterized by the steps of:

placing a carcass ply on the drum;

placing a pair of elastomeric toruses over the carcass ply for their incorporation in bead regions of the tire;

folding turnup ends of the carcass ply back over the elastomeric toruses so that anchored end sections are disposed against the turnup ends;

placing bead cores inward of and adjacent to the enfolded elastomeric toruses relative to the center of the building drum;

expanding the center section of the building drum to secure the bead cores in place; and inflating the carcass to form the tire;

wherein;

the head cores are in a side-by-side relationship with the elastomeric elements; and the tire has a locked bead type of construction, a distinguishing characteristic of which is that there is no filler or apex disposed between a main portion and a turned up portion of the carcass ply.

5. The process of claim 4 including the step of providing the tire building drum with grooves to receive the elastomeric toruses.

6. The process of claim 4 where the center section of the building drum is expanded before the addition of chafer and other tire components on the drum.

7. The tire of claim 1, wherein:

the elastomeric elements are in the form of toruses, and each has a circular cross section.

8. A pneumatic tire comprising:

an axis and an equatorial plane;

a tread region, two bead regions, and two sidewalls;

a reinforcing ply and two bead cores;

wherein:

each sidewall extends generally radially between a respective one of the bead regions and the tread region;

each bead core is disposed in a respective one of the bead regions;

the reinforcing ply extends from one bead core, through a corresponding one of the sidewalls, through the tread region, through the other sidewall, to the other bead core;

the reinforcing ply has two turnup ends at opposite ends thereof, and the turnup ends wrap at least partially around a respective one of the bead cores;

further comprising two elastomeric elements;

wherein:

each elastomeric element is disposed in a respective one of the bead regions adjacent a respective one of the bead cores;

characterized in that:

the elastomeric element is disposed axially inward outward of the respective bead core; wherein:

the bead core is in a side-by-side relationship with the elastomeric element; and the tire has a locked bead type of construction a distinguishing characteristic of which is that there is no filler or apex disposed between a main portion and a turned up portion of the carcass ply.

9. The tire of claim 8, wherein:

the elastomeric elements are in the form of toruses, and each has a circular cross section.

10. The tire of claim 8, wherein:

the elastomeric elements are in the form of toruses, and each has a cross-section selected from the group consisting of square, oblong, triangular, and octagonal.

11. The tire of claim 8 characterized in that:

the elastomeric elements are made of pre-cured rubber.

12. The tire of claim 8 characterized in that:

the elastomeric elements are reinforced by fibers of materials including glass, Aramid, steel or polyester.

13. The tire of claim 8, wherein:

each turnup end extends radially downwardly past the axially inward side of a respective one of the bead cores.

14. The tire of claim 8, wherein:

each turnup end extends axially outwardly under the bead core, then under a respective one elastomeric elements.

15. The tire of claim 14, wherein:

each turnup end wraps radially upward around the axially outward side of the elastomeric element.

16. The tire of claim 15, wherein:

each turnup end extends axially inwardly over the elastomeric element and radially downwardly by the axially inward side of the elastomeric element.

17. The tire of claim 16, wherein:

each turnup end extends axially inwardly under the bead core, between the bead and itself.

* * * * *